(12) United States Patent
Takahashi et al.

(10) Patent No.: US 7,400,566 B2
(45) Date of Patent: Jul. 15, 2008

(54) METHOD OF SEQUENTIALLY RECORDING PROGRAMS USING CALCULATED RECEPTION ENDING TIMES

(75) Inventors: Kazuyuki Takahashi, Chiba (JP); Hirofumi Kasai, Kanagawa (JP); Muzaffar Husain Bin Fakhruddin, Tokyo (JP); Takafumi Yanagimoto, Kanagawa (JP)

(73) Assignee: Sony Corporation (JP)

( * ) Notice: Subject to any disclaimer, the term of this patent is extended or adjusted under 35 U.S.C. 154(b) by 572 days.

(21) Appl. No.: 11/007,549

(22) Filed: Dec. 8, 2004

(65) Prior Publication Data

US 2005/0141353 A1 Jun. 30, 2005

(30) Foreign Application Priority Data

Dec. 9, 2003 (JP) .......................... P2003-409961

(51) Int. Cl.
G11B 11/00 (2006.01)
(52) U.S. Cl. .................................. 369/53.34; 369/53.44
(58) Field of Classification Search ........................ None
See application file for complete search history.

(56) References Cited

U.S. PATENT DOCUMENTS

| 5,805,537 A | 9/1998 | Yamamoto et al. |
| 2002/0021626 A1 | 2/2002 | Nagano |

FOREIGN PATENT DOCUMENTS

| EP | 0 705 036 A2 | 4/1996 |
| EP | 0 823 709 A1 | 2/1998 |
| EP | 0 896 333 A2 | 2/1999 |
| EP | 0 926 679 A2 | 6/1999 |
| JP | 09-251762 A | 9/1997 |
| JP | 2000-036184 A | 2/2000 |
| JP | 2001-168742 A | 6/2001 |
| JP | 2002-063762 A | 2/2002 |
| JP | 2003-317436 A | 11/2003 |
| WO | WO-99/65238 A1 | 12/1999 |

*Primary Examiner*—Paul W. Huber
(74) *Attorney, Agent, or Firm*—Lerner, David, Littenberg, Krumholz & Mentlik, LLP

(57) ABSTRACT

A information recording and reproducing apparatus is capable of recording received audio data in real time in a recording medium, in a searchable state with respect to each piece of music, with simple processing. The information recording and reproducing apparatus receives a data stream including, together with an audio stream, additional information of the piece of music which is currently being transmitted by the audio stream. The additional information includes time information such as the musical performance time of the piece of music and the elapsed time. The information recording and reproducing apparatus records the received audio stream sequentially in an HDD, without change, and on the basis of the received additional information, the reception ending time of the piece of music which is currently being received in the audio stream is calculated. When the calculated reception ending time is reached, recording position information, which shows the recording position in the HDD of the data of the piece of music which is currently being received, is recorded in the HDD in association with additional information of the relevant piece of music as a head position of the piece of music which will be received next.

9 Claims, 7 Drawing Sheets

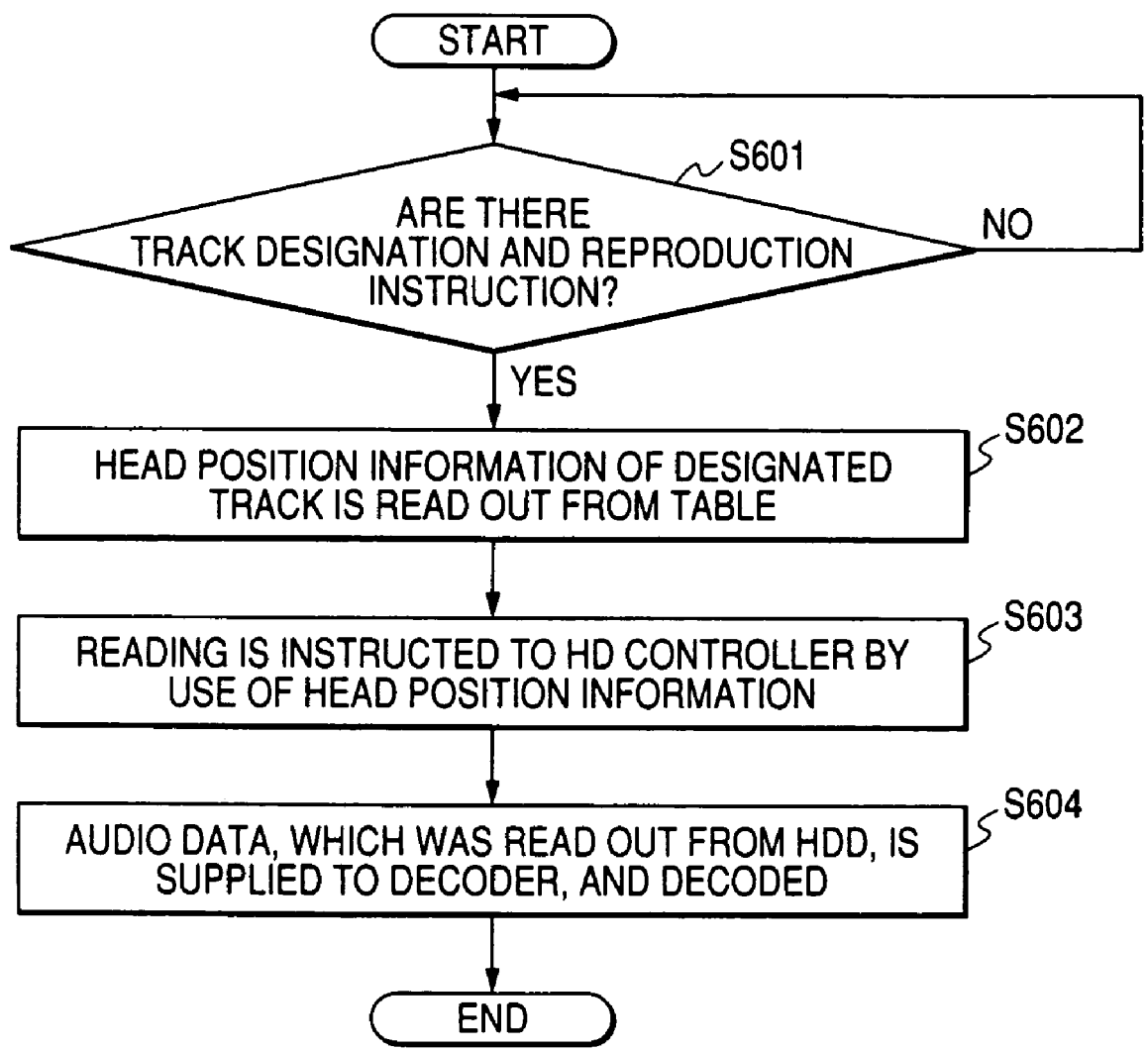

FIG. 7A
MUSIC SELECTION SCREEN

◎ PLEASE SELECT MUSIC TO BE ENTERED IN REPRODUCTION LIST

| | | | |
|---|---|---|---|
| Tr1 | MUSIC A/ARTIST AA | 5 MINUTES | △ |
| Tr2 | MUSIC B/ARTIST BB | 3 MINUTES | |
| Tr3 | MUSIC C/ARTIST CC | 4 MINUTES | |
| Tr4 | MUSIC D/ARTIST DD | 6 MINUTES | △ |

FIG. 7B
REPRODUCTION LIST DISPLAY SCREEN

REPRODUCTION LIST

| | | | |
|---|---|---|---|
| NO. 1 | Tr3 | MUSIC C/ARTIST CC | 4 MINUTES |
| NO. 2 | Tr2 | MUSIC B/ARTIST BB | 3 MINUTES |
| NO. 3 | | — | — |
| NO. 4 | | — | — |
| NO. 5 | | — | — |

▷ TO SELECTION SCREEN

METHOD OF SEQUENTIALLY RECORDING PROGRAMS USING CALCULATED RECEPTION ENDING TIMES

CROSS-REFERENCE TO RELATED APPLICATIONS

The present application claims priority from Japanese Application No. 2003-409961 filed Dec. 9, 2003, the disclosure of which is hereby incorporated by reference herein.

BACKGROUND OF THE INVENTION

This invention relates to an information recording and reproducing apparatus which receives a data stream including content data of programs and additional information including time information with respect to each program in the content data which is currently being transmitted, records it in a recording medium, and reproduces the recorded content, and a method of recording information to a recording medium.

In recent years, digital broadcasting by use of a communication satellite, etc. has become popular. In digital broadcasting, high quality signal transmission is possible, and in addition, multi-channel is realized by improvement of frequency utilization efficiency, and various content such as movies, sports, news, and music are multiplexed to go on the air.

As one example of such content, an all music radio program using digital audio data may be broadcast. For example, there may be a broadcast channel in which music audio data, which was compressed by use of an audio compression system such as MPEG (Moving Picture Experts Group), is broadcast continuously. In addition, a service may be rendered in which data, including various additional information pertaining to the music being distributed, is distributed in parallel with the audio data, and thereby a user, who is listening to music, can visually recognize additional information as to the music, and can also record it in a recording medium together with the audio data of the music. The additional information may include, for example, the name of the music and the name of the artist, such as the musical performer.

On one hand, in recent years, high capacity recording apparatuses which use writable types of DVDs (Digital Versatile Disk) and HDDs (Hard Disk Drive), etc. have been marketed at low prices, and it has become possible to record in such recording apparatuses a number of songs which were distributed in the all music radio program as described above. For example, in the case of distributed music which was compressed and encoded by an MPEG-AUDIO-Layer 2 system, it has become possible to record approximately 700 hours of audio data to HDD with 80 Gbytes of storage.

In the case of recording distributed music in a recording apparatus, the recording is normally carried out by a music unit, and therefore, in the recording apparatus, it is desired to determine a boundary of music which is distributed continuously, and to automatically record audio signals received with respect to each piece of music. In the past, automatic recording of each piece of music was easily realized by automatically detecting a silent period between pieces of music on the basis of the level of audio data which was input. Further, there was also a data transfer system in which, in a receiving apparatus which receives broadcast content in music distribution, etc., the start point of a piece of music is determined from additional information which was transmitted in parallel with the audio data as described above, and an audio signal, which is output from a receiving apparatus to a recording apparatus, is made to be silent for a predetermined time period prior to the start point. Such system thereby enabled the boundary of the piece of music to be accurately determined in the recording apparatus. See, for example, Japanese Patent Publication No. JP-A-2000-36184, described below.

In addition, since it is possible to record the audio data of a number of pieces of music in a high capacity recording apparatus, a technique for easily searching the recorded audio data has been sought. As an example of this, there was a recording apparatus which was configured in such a manner that, when audio data was recorded to a portable optical disk medium such as a DVD, in audio frame information in an audio packet in which a head of the audio frame is included, a fast access unit pointer, which shows a recording position of that head, has been recorded, and at the time of reproduction, it is possible to easily search the start position of the audio frame by use of the fast access unit pointer as a clue See, for example, Japanese Patent Publication No. JP-A-9-251762 (U.S. Pat. No. 5,805,537), described below.

As described above, it is desired to record audio data of an arbitrary piece of music in a recording apparatus in real time at the same time as receiving an all music broadcast channel to listen to and view music, and further to easily search and reproduce audio data which was recorded in the recording apparatus in a music unit. However, during the recording of audio data, when a silent period is to be detected on the basis of the level of audio data which is input in order to determine a boundary of a piece of music, it may not be possible to surely detect the boundary when the silent period between pieces of distributed music is short, and inversely, when the silent period is lengthened and distributed, the number of pieces of music which can be distributed becomes small.

In this regard, it is desired to describe the performance time of a piece of music and the elapsed time, etc. in additional information which is distributed in parallel with the audio data, and to surely detect the starting point of the piece of music by the use of this information. However, in order to realize such automatic detection in a conventional system, processes such as the exchange of signals between a receiving apparatus which receives broadcasts and a recording apparatus, and the generation of information to be recorded, become complex. In particular, in recent years, apparatuses for recording video/audio data in an HDD have increased, and it is desirable to record audio and video data received through broadcasting in an HDD in real time with simple processing, and to easily search data which was recorded.

Meanwhile, in the recording apparatus which was disclosed in Japanese Patent Publication No. JP-A-9-251762, after an audio signal is input, that audio signal and control information are stored in an HDD, and thereafter, information which was read out from the HDD is multiplexed and recorded on a recording medium, and it is difficult to receive the input of an audio signal and record information which shows a head part of that audio signal and music, etc. in real time.

SUMMARY OF THE INVENTION

It is an object of the invention to provide an information recording and reproducing apparatus which is capable of recording audio data of music, which was received as a data stream, in a recording medium in real time with simple processing in a searchable state with respect to each piece of music.

It is another object of the invention to provide an information recording method which is capable to recording audio data of music, which was received as a data stream, in a recording medium in real time with simple processing in a searchable state with respect to each piece of music.

An information recording and reproducing apparatus according to the invention receives a data stream currently being transmitted, the data stream including content data and additional information including time information with respect to each program in the content data, records the data stream in the recording medium and reproduces the recorded content data. The information recording and reproducing apparatus includes a time calculation unit operable to calculate a reception ending time of a program in the content data currently being received based on the received additional information; and a recording control unit operable to record the received content data sequentially in the recording medium, and to record position information in the recording medium in association with the additional information of the program as a head position of another program which will be received next, the position information indicating a recording position of the recorded content data in the recording medium and being recorded at the calculated reception ending time of the program.

In such information recording and reproducing apparatus, additional information, which includes time information with respect to each program in the content data, is received together with the content data, and the reception ending time of a program which is currently being received in the content data is calculated by the time calculation unit on the basis of the received additional information. By this means, the reception time of the beginning of a program which will be received next is calculated. In addition, by control of the recording control unit, the received content data is recorded sequentially in the recording medium. With this, the recording control unit records position information in the recording medium in association with the additional information of another program which will be received next. The position information indicates a recording position of the recorded content data in the recording medium and is recorded at the calculated reception ending time of the program. By this means, it becomes possible to recognize the recording position of the beginning of a corresponding program in the recording medium by reading out the recording position information which was associated with the additional information recorded in the recording medium.

The invention also provides a method for receiving a data stream currently being transmitted, the data stream including content data and additional information including time information with respect to each program in the content data, and for recording the data stream in a recording medium. The method includes calculating a reception ending time of a program in the content data currently being received based on the received additional information; and recording the received content data sequentially in the recording medium, and recording position information in the recording medium in association with the additional information of the program as a head position of another program which will be received next, the position information indicating a recording position of the recorded content data in the recording medium and being recorded at the calculated reception ending time of the program.

In such information recording method, during a period that additional information, which includes time information with respect to each program in the content data, is received together with the content data, the reception ending time of a program which is currently being received in the content data is calculated on the basis of the received additional information. By this means, the reception time of the beginning of another program which will be received next is calculated. In addition, the received content data is recorded sequentially in the recording medium, and position information is recorded in the recording medium in association with the additional information of another program which will be received next. The position information indicates a recording position of the recorded content data in the recording medium and is recorded at the calculated reception ending time of the program. By this means, it is possible to recognize the recording position of the beginning of a corresponding program in the recording medium by reading out the position information associated with the additional information recorded in the recording medium.

According to an information recording and reproducing apparatus of the invention, received content data is recorded sequentially in a recording medium, and position information is recorded in the recording medium in association with additional information of a program. The position information indicates a recording position of the beginning of the program in the recording medium. Therefore, while it is possible to record received content data and additional information in real time with simple processing, it is also possible to easily search and read out recorded content data in a program unit.

In addition, according to an information recording method of the invention, recorded content data is recorded sequentially in a recording medium, and position information is recorded in the recording medium in association with additional information of a program, the position information indicating a recording position of the beginning of the program in the recording medium. Therefore, while it is possible to record received content data and additional information in real time with simple processing, it is also possible to easily search and read out recorded content data in a program unit.

BRIEF DESCRIPTION OF THE DRAWINGS

The invention, together with further advantages thereof, may best be understood by reference to the following description taken in conjunction with the accompanying drawings in which:

FIG. 6 is a flow chart which shows a basic process for reproducing music which was recorded in the HDD; and FIG. 7 is a view which shows an example of a screen display for automatic reproduction of recorded music.

DETAILED DESCRIPTION

Hereinafter, assuming that the invention was applied to satellite digital broadcasts using a communication satellite, embodiments of the invention will be described in detail with reference to the drawings. This satellite broadcasting is configured to be able to receive a broadcast channel in which an all music radio program is broadcast (hereinafter, referred to as a music channel), in addition to a TV channel in which a normal television program, which is composed of moving images and audio, is broadcast.

Figure 1:
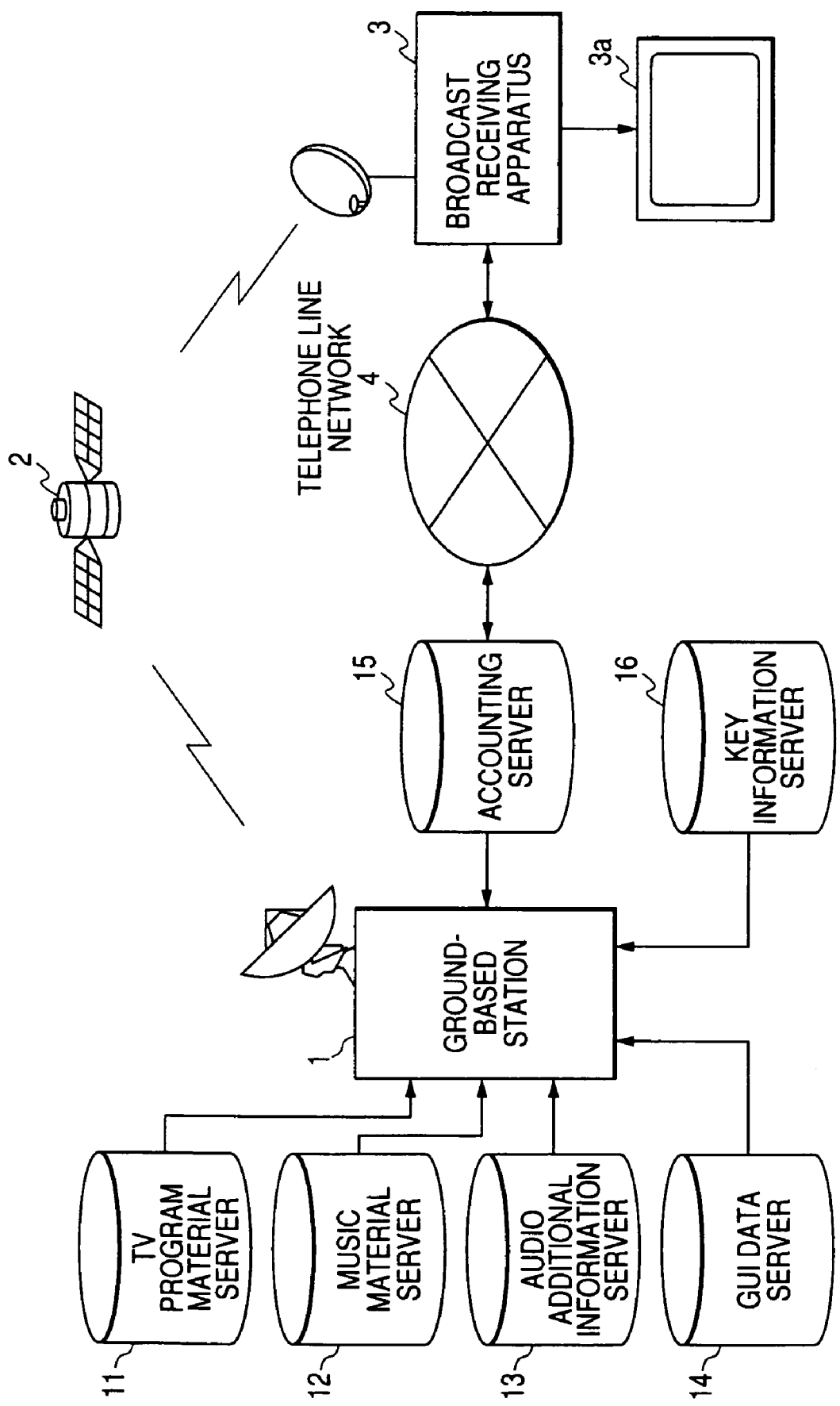
FIG. 1 is a view which shows an example of the system configuration of a satellite digital broadcasting system which relates to an embodiment of the invention.

FIG. 1 is a view which shows an example of the system configuration of a satellite digital broadcasting system which relates to an embodiment of the invention.

The satellite digital broadcasting system shown in FIG. 1 has a ground-based station 1 which transmits satellite digital broadcasts, a communication satellite 2 which relays airwaves which were transmitted from the ground-based station 1, and a broadcast receiving apparatus 3 which receives the airwaves which were relayed by the communication satellite 2. In addition, the ground-based station 1 and the broadcast receiving apparatus 3 are connected by a telephone line network 4.

The ground-based station 1 has a TV program material server 11, a music material server 12, and an audio additional information server 13 as servers which provide materials of broadcast content, and also has a GUI (Graphical User Interface) data server 14 which provides GUI data for hearing and viewing the provided content in the broadcast receiving apparatus 3. Further, it has an accounting server 15 and a key information server 16 as an authentication server when content is received in the broadcast receiving apparatus 3.

The TV program material server 11 provides materials for TV channels, such as movies and sports live coverage, to the ground-based station 1. Moving image data and audio data are stored in the TV program material server 11, and that data is transmitted sequentially to the ground-based station 1 in accordance with a broadcast program.

The music material server 12 provides audio data, which is distributed through a music channel, to the ground-based station 1. Audio data of music is stored in the music material server 12, and that audio data is transmitted sequentially to the ground-based station 1 in accordance with a broadcast program.

The audio additional information server 13 provides various additional information regarding music which is distributed through a music channel. The additional information for music which is being transmitted to the ground-based station 1 is transmitted by the audio additional information server 13 to the ground-based station 1 in conjunction with an operation of the music material server 12. Included in this additional information are titles of music, names of artists, musical performance time, elapsed time and so on, as will be described later.

The GUI data server 14 provides GUI data for forming screens of a page listing music which has been distributed through a music channel and an information page for each piece of music, jacket images for each piece of music, a screen for use in an EPG (Electric Program Guide) and so on. The above-described various GUI data which corresponds to music which has been transmitted to the ground-based station 1 is transmitted by the GUI data server 14 to the ground-based station 1 in conjunction with operations of the music material server 12 and the audio additional information server 13.

The accounting server 15 carries out accounting processing to audiences who receive broadcasts to listen and view the same. The accounting server 15 keeps up contract information regarding program listening and viewing for each audience, and carries out accounting as to PPV (Pay Per View) programs, in accordance with program listening and viewing history information which is transmitted from the broadcast receiving apparatus 3, and makes appropriate charges to the audiences.

The key information server 16 provides key information to the ground-based station 1 when applying scramble processing to broadcast content data.

The ground-based station 1 multiplexes moving images/audio data from the TV program material server 11, audio data from the music material server 12, additional information from the audio additional information server 13, GUI data from the GUI data server 14, and so on, together with an ECD (Entitlement Control Message) which shows listening and viewing conditions for each program and an EMM (Entitlement Management Message) which shows contract information of audiences, to generate a transport stream. At this time, the moving image/audio data from the TV program material server 11, and the audio data from the music material server 12 are compressed and encoded by an MPEG system. In addition, scramble processing is applied to the program content data which is transmitted by a limited reception system, by use of the key information from the key information server 16.

Meanwhile, in a music channel using the audio data from the music material server 12, music is distributed continuously, and additional information is distributed regarding the music which is currently being distributed. The additional information from the audio additional information server 13 is multiplexed as a data stream which is separated from an audio stream for transferring the audio data from the music material server 12. In the broadcast receiving apparatus 3, a GUI screen is displayed based on the GUI data from the GUI data server 14, and by an operation to this GUI screen, it becomes possible to display the content of the additional information pertaining to the music which is being distributed, or to have it recorded in a recording medium.

Further, the ground-based station 1, after it adds an error correction code to the generated transport stream, applies QPSK (Quadrature Phase Shift Keying) modulation thereto, and transmits it to the communication satellite 2.

On one hand, the broadcast receiving apparatus 3 has a function as an IRD (Integrated Receiver Decoder) which receives airwaves from the communication satellite 2, selects a program in a desired channel, and demodulates it, and a function as a recording and reproducing apparatus which records the data of selected program content, and reproduces the recorded data. An output signal of the broadcast receiving apparatus 3 is supplied to, for example, a television receiver 3a, and by this means, it becomes possible to listen to and view a program of the selected channel, and so on.

Figure 2:
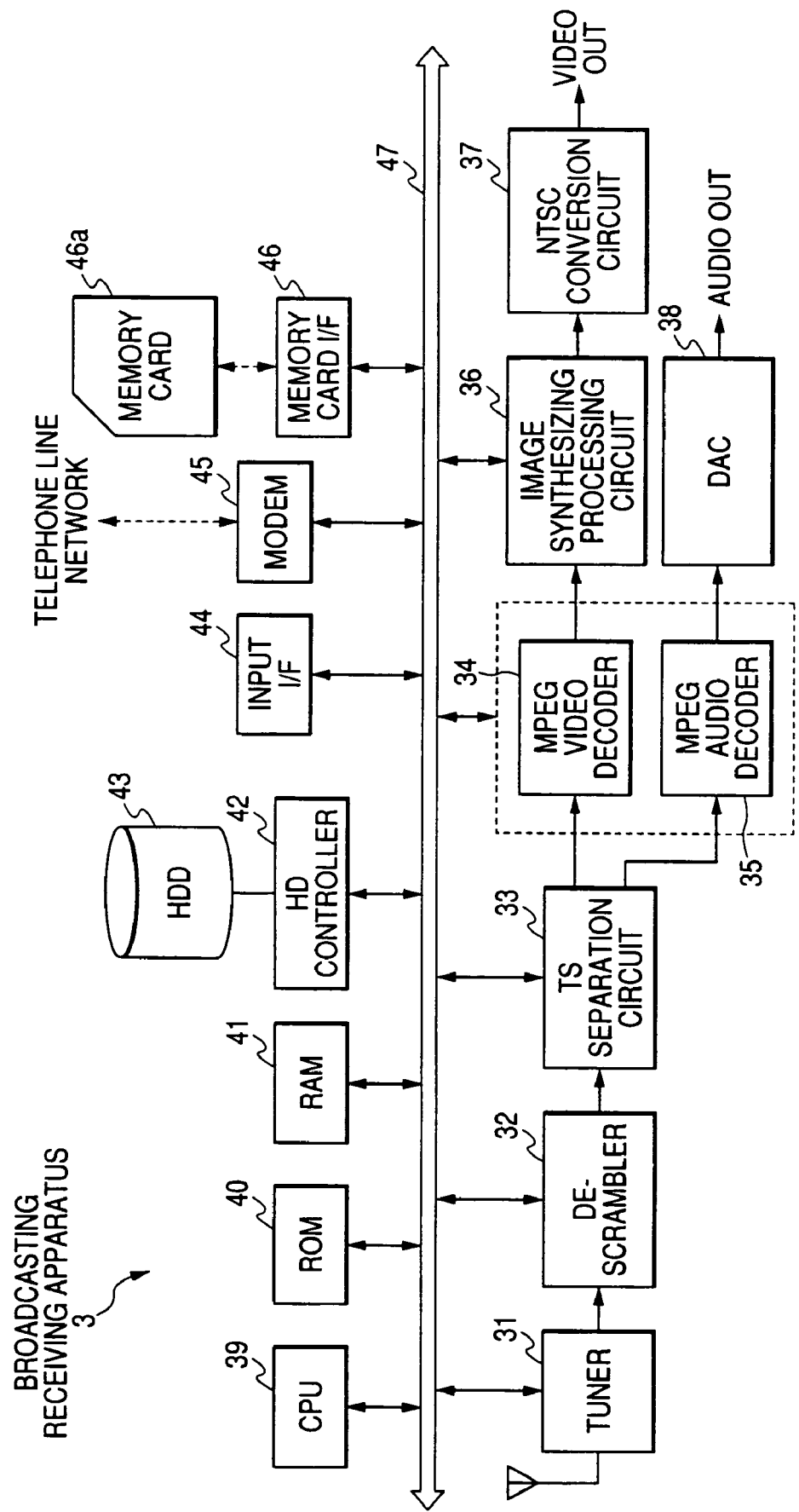
FIG. 2 is a block diagram which shows an example of the internal configuration of a broadcast receiving apparatus which relates to the embodiment of the invention.

FIG. 2 is a block diagram which shows an example of the internal configuration of the broadcast receiving apparatus 3.

As shown in FIG. 2, the broadcast receiving apparatus 3 has a tuner 31, a descrambler 32, a TS separation circuit 33, an MPEG video decoder 34, an MPEG audio decoder 35, an image synthesizing processing circuit 36, an NTSC (National Television Standards Committee) conversion circuit 37, a DA converter 38, a CPU (Central Processing Unit) 39, a ROM (Read Only Memory) 40, a RAM (Random Access Memory) 41, an HD controller 42, an HDD 43, an input I/F (Interface) 44, a modem 45, and a memory card I/F 46. In addition, a memory card 46a is loaded in the memory card I/F 46. The broadcast receiving apparatus 3 is configured in such a manner that the CPU 39 connects to each component in the apparatus through an internal bus 47, and executes general control of these components.

The tuner 31 receives an input of airwaves which were received by an antenna, and then selects a signal of a predetermined carrier frequency in accordance with an instruction from the CPU 39, applies QPSK demodulation and error correction processing, and outputs a transport stream to the descrambler 32.

The descrambler 32 extracts the ECM and the EEM from the transport stream received from the tuner 31, and supplies them to the CPU 39. In addition, the descrambler 32 applies descramble processing, using key information which was read out from the memory card 46a, to broadcast content data in the transport stream which was determined to be able to be listened to and viewed by control of the CPU 39.

The TS separation circuit 33 separates a packet (TS packet) in which data designated by the CPU 39 was stored, such as moving image data and audio data, from the transport stream to which the descramble processing was applied. Packets which include moving image data and audio data for a TV channel are supplied to the MPEG video decoder 34 and the MPEG audio decoder 35, respectively, and packets which include audio data for a music channel are supplied to the MPEG audio decoder 35. In addition, when any of this data is recorded, the associated packet is supplied through the internal bus 47 to HDD 43 and RAM 41 under the control of CPU 39. In addition, packets which include additional information and GUI data for audio data in the transport stream are supplied through the internal bus 47 to CPU 39, and predetermined processing is carried out.

The MPEG video decoder 34 applies decompression and decoding processing to moving image data in the packet which was supplied from the TS separation circuit 33, or supplied through the internal bus 47, in accordance with an MPEG-2 system, and outputs the moving image data after processing to the image synthesizing processing circuit 36. In addition, the MPEG audio decoder 35 applies decompression and decoding processing to audio data in the packet which was supplied from the TS separation circuit 33, or supplied through the internal bus 47, in accordance with an MPEG-AUDIO-Layer 2 system, and outputs the audio data after processing to the DA converter 38.

The image synthesizing processing circuit 36 synthesizes data of GUI images which was generated by the processing of the CPU 39, with the moving image data which was processed by the MPEG video decoder 34, according to need, and outputs the synthesized data to the NTSC conversion circuit 37. The NTSC conversion circuit 37 converts image data which was generated by the image synthesizing processing circuit 36 into NTSC system analog image signals, and outputs them to the television receiver 3a. The DA converter 38 converts the audio data which was processed by the MPEG audio decoder 35 into analog audio signals, and outputs them to the television receiver 3a.

CPU 39 controls each part in the broadcast receiving apparatus 3 by executing a program which was stored in ROM 40. In ROM 40, various data, such as OS (Operating System), BIOS (Basic Input/Output System) and application programs, have been stored in advance. RAM 41 temporarily stores at least a part of a program which is executed by CPU 39, and various data necessary for processing by this program.

The HD controller 42 controls data writing and reading operations in HDD 43 on the basis of command and address information which is designated by CPU 39. Various broadcast content, such as moving image data and audio data, and additional information, etc., are recorded in HDD 43.

The input I/F 44 has a receiving circuit which receives, for example, an infrared signal from a remote controller which is not shown in the figure, an operation switch with which a user carries out a manual operation, and so on, and supplies a control signal to CPU 39 which complies with an input operation of a user. The modem 45 is a communication I/F circuit connected to a telephone line for carrying out communications.

The memory card I/F 46 is an I/F circuit which controls writing and reading operations to the loaded memory card 46a. The memory card 46a is composed of a non-volatile semiconductor memory, and stored in this memory card 46a are contract information extracted from a broadcast receiving signal, key information for use in descramble, and so on.

A basic operation in this broadcast receiving apparatus 3 will now be described.

Firstly, CPU 39 outputs channel selection information to the tuner 31 on the basis of the control signal from the input I/F 44, and in the tuner 31, a received signal with a carrier frequency which complies with the input channel selection information is selected and demodulated. The demodulated transport stream is supplied to the descrambler 32, and when contract information of the relevant audience is extracted from the EEM which was extracted from the transport stream by control of the CPU 39, this contract information is written in the memory card 46a. In addition, under the control of CPU 39, the contract information which was read out from the memory card 46a and the ECM which was extracted from the transport stream from the tuner 31 are verified, and by the use of the key information for use in descramble which is read out from the memory card 46a, descramble processing is applied in the descrambler 32 to broadcast content which can be listened to and viewed.

When a TV channel is selected by a user, a packet including moving image data and audio data of the designated channel is separated by the TS separation circuit 33 from the transport stream to which the descramble processing was applied, and decompression and decoding processing is applied thereto by the MPEG video decoder 34 and the MPEG audio decoder 35, respectively. The moving image data after processing is supplied through the image synthesizing processing circuit 36 to the NTSC conversion circuit 37, and the audio data after processing is supplied to the DA converter 38. By this means, the selected television program is reproduced and output on the television receiver 3a.

In addition, if picture recording is requested by an input operation of a user during a period that a TV channel is being received, the relevant packets of moving image data and audio data, which were separated in the TS separation circuit 33, are recorded sequentially in HDD 43 through the HD controller 42. Further, if the reproduction of the television program recorded in HDD 43 is requested, the relevant moving image data and audio data are read out from HDD 43 and supplied to the MPEG video decoder 34 and the MPEG audio decoder 35, respectively, and decompression and decoding processing is applied thereto. By this means, the recorded television program is reproduced on the television receiver 3a.

If a music channel is selected by a user, a packet including audio data which corresponds to the designated music channel, and a packet including additional information and GUI data which correspond to this channel, are separated from the transport stream to which descramble processing was applied. The packet of audio data is supplied to the MPEG audio decoder 35, and decompression and decoding processing is applied thereto, and the audio data after processing is supplied to the DA converter 38. By this means, distributed music is reproduced and output on the television receiver 3a.

In addition, each packet of the additional information and GUI data which were separated in the TS separation circuit 33 is supplied to CPU 39. CPU 39 synthesizes GUI images with images output by the image synthesizing processing circuit 36 on the basis of the GUI data among them, and outputs the result to the television receiver 3a through the NTSC conversion circuit 37 to display the GUI images. In accordance with an input of a user to the GUI images, necessary information is extracted from the additional information, and the extracted information is synthesized with the output images in the image synthesizing processing circuit 36, as for example, character data, etc. By this means, a user can display on the television receiver 3a additional information pertaining to music which is distributed.

Further, if audio recording is requested by an input operation of a user during a period that a music channel is being received, a packet of audio data, which was separated in the TS separation circuit 33, is recorded sequentially in HDD 43. Together with this, a meta data table is written in HDD 43 on the basis of time information in the separated additional information. The meta data table includes a writing position, etc. in which the head data of music to be recorded were stored in HDD 43.

When the reproduction of audio data of the music channel which was recorded in HDD 43 is requested, CPU 39 designates a recording position of the head data of the designated music in the HD controller 42, with reference to the above-described meta data table. By this means, audio data of the designated music is read out from HDD 43 and supplied to the MPEG audio decoder 35, and after decompression and decoding processing is applied thereto, it is output through the DA converter 38 and reproduced and output on the television receiver 3a. In addition, at this time, it is also possible to read out additional information of the reproduced music from the meta data table, and to display it on the television receiver 3a.

The broadcast receiving apparatus 3 may also be provided with a communication I/F for communicating with external devices, enabling packets of desired moving image data and audio data which were separated in the TS separation circuit 33 from the received transport stream to be transmitted to external devices through the communication I/F, or enabling the moving image data and audio data to be received from external devices through the communication I/F for recordation in HDD 43, and for decompression and decoding for output to the television receiver 3a. In addition, the broadcast receiving apparatus 3 may enable the decompressed and decoded moving image data and audio data to be output to the outside from the communication I/F and a digital output terminal, etc., without modification.

Next, processing to record audio data which was received through a music channel will be described in detail.

Figure 3:
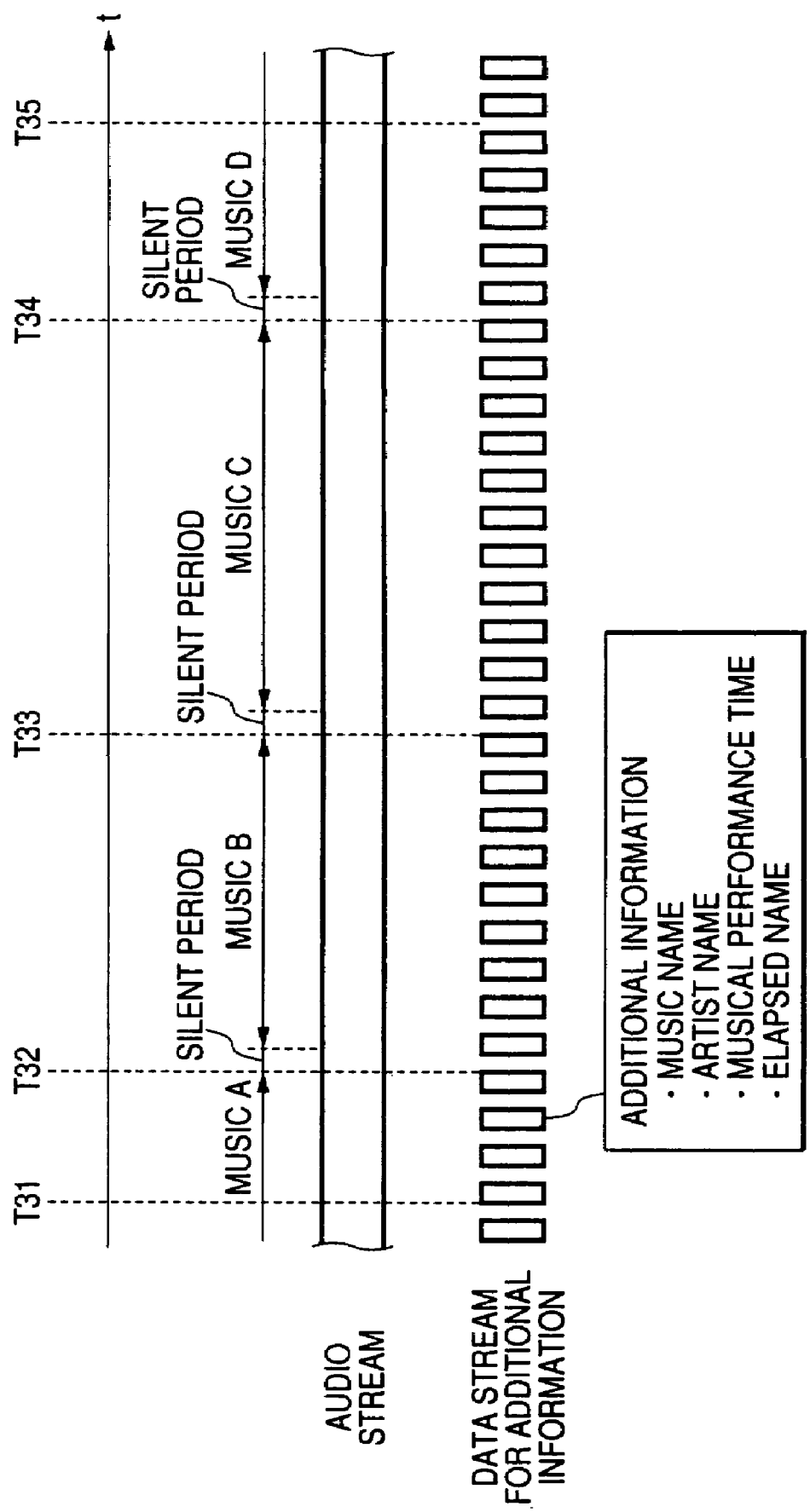
FIG. 3 is a view which schematically shows the configuration of a data stream which is transmitted in a music channel.

FIG. 3 is a view which schematically shows the configuration of a data stream which is transmitted in a music channel.

As described above, additional information which corresponds to the music is transmitted in the music channel together with audio data of the music. As shown in FIG. 3, in an audio stream in which audio data is stored, audio data of each piece of music is continuously stored, sandwiching a silent period of approximately several seconds. In a practical sense, the audio stream is configured in such a manner that, after the audio data has been divided into PES (Packetized Elementary Stream) packets based on the MPEG-2 system and stored, the PES packet train is further divided into TS packets. A PTS (Presentation Time Stamp), etc. which show the reproduction output time of the audio data are stored in a header of the PES packet, and a PCR (Program Clock Reference) for setting a count value of an STC (System Time Clock) which gives the reproduction time standard in a reproducing apparatus, a PID (Packet Identifier) for separating a desired data stream from a transport stream, and so on are stored in a header of the TS packet.

On one hand, additional information is stored in a data stream which is different from the audio stream, as shown in FIG. 3, and transferred. The additional information is stored in the TS packet and transferred in the same manner. Described in the additional information are the name of the piece of music, the name of the artist who is performing the piece of music, the musical performance time which shows the time from the start of the performance of the piece of music up to the end of the performance, the elapsed time from the start of the performance of the relevant piece of music as to the audio data which is now being transmitted, and so on. The additional information corresponds to the piece of music which is being transmitted by an audio stream at that point in time, and is transmitted at certain time intervals which are sufficiently shorter than the performance time of one piece of music, coming along with the transmission of the audio stream.

In the meantime, since the audio stream consists of audio data of music that is simply being transferred continuously, it is not possible to determine a boundary of the music only from the audio stream. However, by referring to the musical performance time and the elapsed time which are stored in the additional information, it is possible to determine the boundary of the music. For example, at time T31 for receiving the piece of music A in FIG. 3, by subtracting the elapsed time from the musical performance time with reference to the additional information which was received at this time, it is possible to calculate the time until the reception of the piece of music A will end. The reception ending time, which is calculated from this time, can be deemed as the reception start time of piece of music B which will be received next.

In the example of FIG. 3, when recording of the audio stream is started at time T31, the piece of music A is recorded in midstream, and its reception ending time (corresponds to time T32) is calculated from the additional information which corresponds to the piece of music A. When the reception of the piece of music A ends at time T32, the piece of music B is received and recorded on and on, and in the same manner, its reception ending time (corresponds to time T33) is calculated from the additional information which corresponds to the piece of music B. Subsequently, the reception/recording of the piece of music C is started at time T33 in the same manner, and the reception/recording of the piece of music D is started at time T34. In addition, in FIG. 3, the completion of recording is instructed at time T35, which is halfway through the reception of the piece of music D.

In the broadcast receiving apparatus 3 which relates to this embodiment, when recording audio data which was received through a music channel in HDD 43, a TS packet train including data of an audio stream which was separated in the TS separation circuit 33 is recorded in HDD 43 without change. By this means, processing at the time of recording is simplified, and real-time recording of an audio stream which is being received is realized easily.

In addition, the reception time of a boundary of the music is detected from time information in the additional information which was received at the same time, and a recording position of the beginning of the next piece of music in HDD 43 is stored together with the additional information in the meta data table, and recorded in HDD 43. This enables the recorded audio data to be searched with respect to each piece of music by referring to this meta data table.

An example of the configuration of the meta data table is shown in Table 1.

TABLE 1

|  | Track Number | | | |
| --- | --- | --- | --- | --- |
|  | 1 | 2 | 3 | 4 |
| Head Position Information | xxxx | xxxx | xxxx | xxxx |
| Music Name | Music A | Music B | Music C | Music D |
| Artist Name | Artist AA | Artist BB | Artist CC | Artist DD |
| Performance Time | 5 Minutes | 3 Minutes | 4 Minutes | 6 Minutes |
| State Flag | 1 (Imperfection) | 0 (Perfection) | 0 (Perfection) | 1 (Imperfection) |

Table 1 shows, as an example, a meta data table which is generated when recording is started at time T31 shown in FIG. 3 and is ended at time T35. In the meta data table, for example, track numbers are assigned in an order corresponding to the order in which the music was received, and, for each track number, the position number on HDD 43 in which the beginning of the piece of music was recorded (referred to as head position information), the name of the piece of music as determined from the additional information which corresponds to the piece of music, the name of the artist, and the musical performance time are stored. The head position information is assumed to be represented by, as an example, a sector number which is a minimum unit of reading and writing in HDD 43.

Further, it is also possible to store in the meta data table a state flag showing whether audio data of the recorded piece of music is recorded in the HDD from the beginning to the end of the piece of music. The state flag is represented by, for example, 1 bit of data, and takes a value of "0" when the beginning through the end were recorded perfectly, and takes a value of "1" in an imperfect case, i.e., when recording is started from the halfway point of the piece of music, or when recording is ended in midstream in the piece of music.

Figure 4:
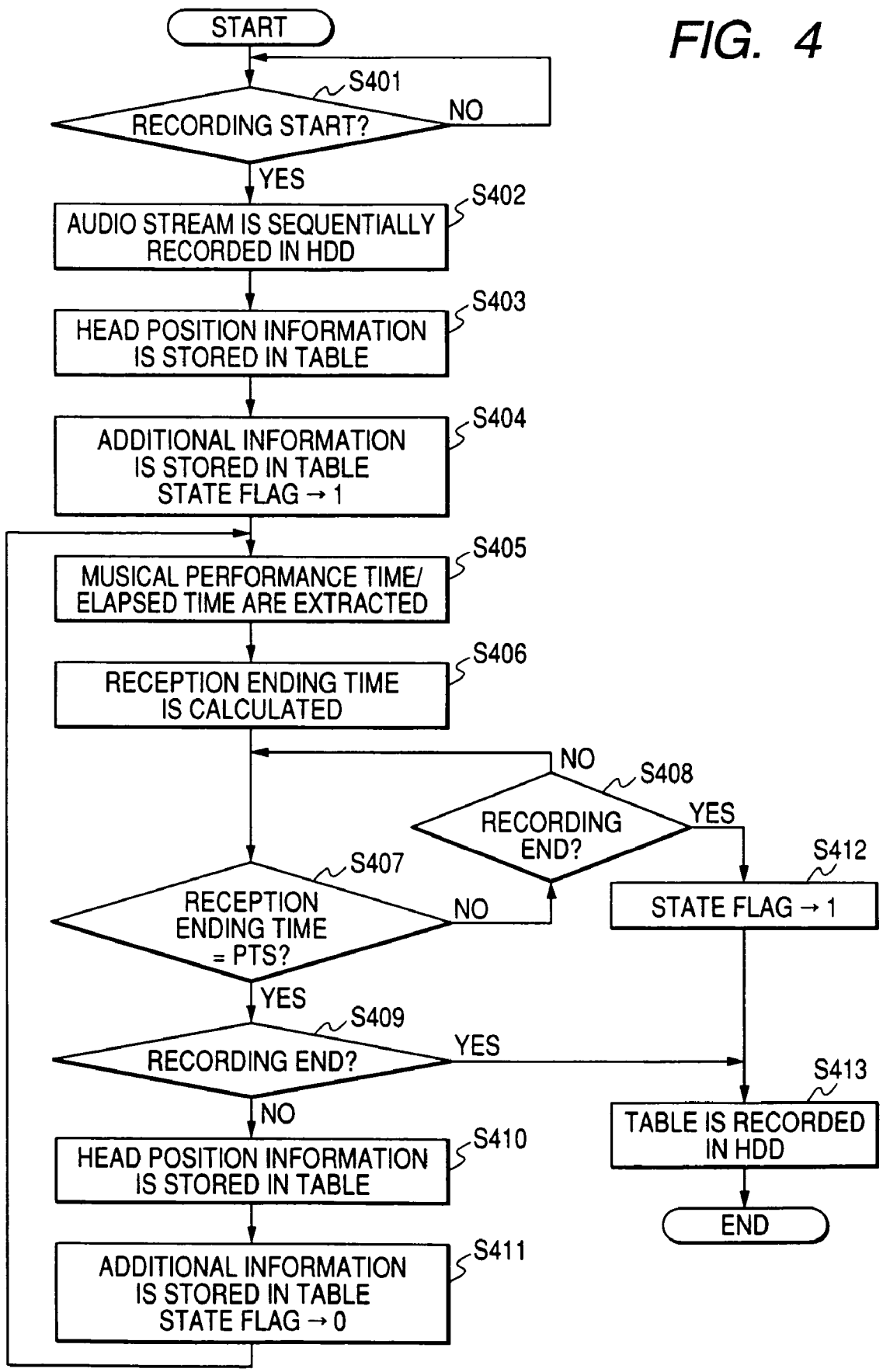
FIG. 4 is a flow chart which shows a process of recording data of the music channel in the broadcast receiving apparatus.

FIG. 4 is a flow chart which shows a process of recording data of a music channel in the broadcast receiving apparatus 3.

When a music channel has been selected and the start of recording has been instructed by, for example, an input operation, etc. of a user in step S401, the process goes to step S402.

In step S402, TS packets of a corresponding audio stream which was separated in the TS separation circuit 33 are recorded sequentially in HDD 43.

In step S403, recording position information (corresponds to a sector number), which was identified by the HD controller 42 at the time recording of the audio stream was started, is stored as head position information in a meta data table of music which is being received. Meanwhile, at this time, the meta data table is temporarily generated, for example, in RAM 41, and stored in HDD 43 after completion of recording.

In step S404, the name of the piece of music, the artist name and the musical performance time are extracted from the additional information which is received, and are stored in the meta data table. In addition, at this time, it is determined that recording was started from the halfway point of the piece of music, and this is recorded with a state flag of "1". Meanwhile, for example, if it can be determined whether the piece of music was recorded from the beginning of the piece of music by examining the accordance/discordance of the musical performance time and the elapsed time in the additional information, the value of a state flag which corresponds to that determination may be recorded.

In step S405, the musical performance time and the elapsed time are extracted from the additional information.

In step S406, the reception ending time of the piece of music which is currently being received is calculated from the extracted musical performance time and the elapsed time. More particularly, a value resulting from subtracting the elapsed time from the musical performance time is converted to time information with the frequency (27MHz) of the STC as a standard. In addition, at this time, CPU 39 is counting the STC, and a count value of the STC is corrected on the basis of the PCR which was extracted from the audio stream.

In step S407, the value of the PTS in the audio data stream which is now being received is monitored, and it is determined whether it accords with the reception ending time which was calculated in step S406. Meanwhile, at this time, in a practical sense, the value of the PTS is converted to time information with the frequency of the STC as a standard to make the comparison. If it does not accord, the process goes to step S408.

In step S408, a determination is made as to whether the end of recording was instructed by an input operation of a user, and if it was not so instructed, the process returns to step S407 to keep on monitoring the PTS, and if it was so instructed, the process proceeds to step S412. If the reception ending time accords with the PTS in step S407, the process proceeds to step S409.

In step S409, a determination is made as to whether the end of recording was instructed by, for example, an input operation, etc. of a user, and if it was not so instructed, the process proceeds to step S410, and if it was so instructed, the process proceeds to step S413. When the process proceeds to step S410, the recording of the piece of music which has been received until that moment is to be ended, and the recording of the next piece of music is to be started.

In step S410, the recording position information for recording the next TS packet in HDD 43 is stored in the meta data table in the column of the head position information which corresponds to the next piece of music.

In step S411, the name of the piece of music, the artist name and the musical performance time are extracted from the additional information of the next piece of music and are stored in the meta data table. In addition, the meta data table is recorded with a state flag of "0". After that, the process returns to step S405, and the reception ending time of the next piece of music is calculated, and that time and the PTS are compared.

In addition, in step S408, if the end of recording was instructed by, for example, an input operation, etc. of a user before the piece of music reaches the reception ending time, it is determined that recording was ended midstream in the piece of music, and therefore, in step S412, a state flag which corresponds to the piece of music being recorded at this time is rewritten to "1" in the meta data table. Meanwhile, if the end of recording was instructed in step S409 and the end of the piece of music is reached, the state flag stays "0" without change.

In step S413, after the recording of an audio stream in HDD 43 is completed, the meta data table, which was temporarily recorded in RAM 41, is recorded in HDD 43 to complete the processing.

By the above-described process, while the audio stream is sequentially recorded in HDD 43, the recording positions of the beginning of each piece of music in that audio stream are recorded in the meta data table. Therefore, by simple processing, it is possible to record the received audio stream in HDD 43 in real time, and it is possible to search the recorded audio stream with respect to each piece of music. In addition, it is possible to record additional information together with the recording positions in an associated manner, and therefore, it is possible to output additional information of the pieces of music which were recorded in HDD 43 as a music list which was displayed as a list, etc.

Figure 5:
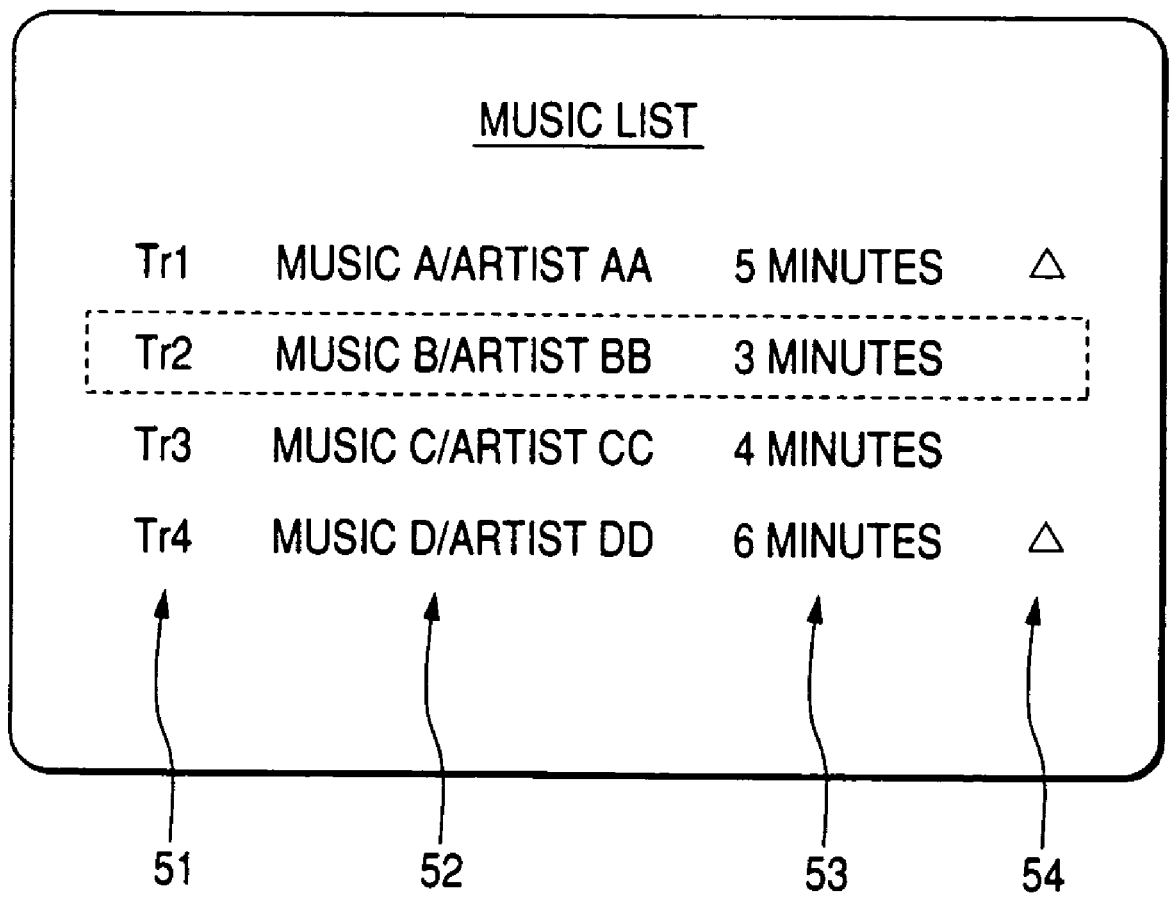
FIG. 5 is a view which shows an example of a screen display of a list of music which was recorded in an HDD.

FIG. 5 is a view which shows an example of a screen display of a list of music which was recorded in HDD 43.

When the display of a music list of the recorded music is requested by an input operation of a user, CPU 39 reads out a meta data table from HDD 43, prepares screen data of the music list and outputs it to the image synthesizing processing circuit 36. By this means, the music list is displayed on the television receiver 3a.

The music list shown in FIG. 5 was generated on the basis of the meta data table shown in Table 1, and is configured by a display part 51 which shows track numbers, a display part 52 which shows the names of pieces of music and artist names, a display part 53 which shows musical performance times (reproduction times), and a display part 54 which shows whether each recording is perfect, and by this means, information as to each piece of music which was recorded in HDD 43 is displayed as a list. In this regard, however, in the display part 53, regardless of whether the piece of music is recorded in a perfect state, the musical performance time which was described in the corresponding additional information is displayed without change.

In the above-described display part 54, the display is carried out in accordance with the state flag which was recorded in the meta data table. In the example of FIG. 5, a predetermined mark is displayed only when the relevant piece of music has been recorded in an imperfect state. In the broadcast receiving apparatus 3 as described above, the audio data itself is not recorded on HDD 43 by a music unit, and is recorded in the state of the audio stream without change, and therefore, as to the first piece of music and last piece of music during a single period of recording, the possibility is great that the entirety of those pieces of music cannot be recorded perfectly. Therefore, by notifying the user of the recording state of the audio data of the music by displaying it in the display part 54 on the basis of the state flag, it is possible to heighten the convenience of the user.

Meanwhile, in the above-described process example of FIG. 4, even if the recording was started from the halfway point of a piece of music, the audio data of that piece of music is recorded in HDD 43 as it is, but alternatively, the recording of that piece of music may not be carried out, and the recording operation may be started from the reception ending time of that piece of music. In addition, if the end of recording was instructed midstream in the recording of a piece of music, the writing of the audio stream in HDD 43 may be kept on compulsorily until the reception ending time of that piece of music. By such processing, it is possible to record the audio data of every piece of music in a perfect state.

In addition, it is also possible to select an arbitrary piece of music from the music list shown in FIG. 5, and to reproduce and output it. For example, when the music list is displayed, an arbitrary piece of music may be selected by use of a direction key of a remote controller, and a reproduction button may be depressed to output a signal to CPU 39 instructing that the designated piece of music be reproduced.

FIG. 6 is a flow chart which shows a basic process for reproducing music which was recorded in HDD 43.

In step S601, if an instruction designating a track for reproduction was carried out by an input operation of a user, etc., the process proceeds to step S602.

In step S602, the head position information which corresponds to the designated track is read out with reference to the meta data table.

In step S603, by use of the head position information which was read out, the HD controller 42 is instructed to read information from HDD 43.

In step S604, the audio data which was read out from HDD 43 is sequentially supplied to the MPEG audio decoder 35 to have decompression and decoding processing executed. By this means, the designated music is reproduced and output on the television receiver 3a.

In addition, by referring to the meta data table, it is also possible to automatically reproduce in an arbitrary order pieces of music which were recorded in HDD 43.

FIGS. 7A and 7B are views which show an example of a screen display for automatic reproduction of the recorded music.

FIG. 7A shows a music selection screen for selecting music which will be reproduced automatically from the recorded music. In this music selection screen, a display part 71 displays a list of the recorded music and additional information. In this display part 71, in the same manner as in the music list shown in FIG. 5, it is possible for a user to confirm whether each piece of music has been recorded in a perfect state. An arbitrary piece of music may be selected, for example, by a direction key of a remote controller, and a decision key may be depressed to shift the display to the reproduction list display screen shown in FIG. 7B, and the selected piece of music is then added to the reproduction list.

In the reproduction list display screen of FIG. 7B, a display part 72 displays a list of the selected music in the order of reproduction. In the reproduction list, the artist name, track number, musical performance time, etc. may be displayed in addition to the names of the selected pieces of music. In addition, for example, a designated direction key on the remote controller may be depressed from this screen to return to the music selection screen of FIG. 7A, and it is possible to add further pieces of music to the reproduction list. Also, a reproduction key of the remote controller, for example, may be depressed when the reproduction list display screen is displayed to thereby automatically reproduce the music in the order displayed in the reproduction list.

As described above, by referring to the meta data table, it is possible to carry out the same reproduction operation as when audio data is recorded in HDD 43 as a data file with a music unit. In addition, in the meta data table, the recording position information and additional information are managed in an integrated fashion, and therefore, it is possible to carry out data reading of music and additional information at high speed.

Meanwhile, in the above-described embodiment, the invention was described as being applied to a service for distributing audio data and its additional information through satellite digital broadcasts, but it is also possible to apply it to another digital broadcasting system.

In addition, it is also possible to apply the invention to a service in which moving image data or still image data is distributed together with audio data of music. Further, it is also possible to apply the invention to a service for distributing moving image content, such as movies and live sports coverage, in addition to music. In such case, a received moving image stream and a received audio stream are recorded sequentially in a recording medium without change, and the recording position of the beginning is detected with respect to each program in these streams, such as a movie and a live sports coverage, and is recorded in the meta data table together with additional information.

Further, in the above-described embodiment, additional information of the music was distributed as a data stream which is different from the audio stream, but, for example, the additional information may be inserted in a header, etc. in the audio stream.

In addition to an HDD, the received audio stream, etc. may be recorded on a portable type recording medium such as an optical disk medium, such as a DVD, or a memory card which uses a semiconductor memory. In this regard, however, when recording a data stream such as audio and moving images and a meta data table on such portable type recording medium and reproducing the data stream in an apparatus which is different from the above-described broadcast receiving apparatus, for example, a dedicated application program must be loaded in that apparatus to reproduce data of the audio and moving images out of the data stream with respect to each program such as music on the basis of the meta data table.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. An information recording and reproducing apparatus which receives a data stream currently being transmitted, the data stream including content data and additional information including time information with respect to each program in the content data, records the data stream in a recording medium and reproduces the recorded content data, the information recording and reproducing apparatus comprising:
    a time calculation unit operable to calculate a reception ending time of a program in the content data currently being received based on the received additional information;
    a recording control unit operable to record the received content data sequentially in the recording medium, and to record position information in the recording medium in association with the additional information of the program as a head position of another program which will be received next, the position information indicating a recording position of the recorded content data in the recording medium and being recorded at the calculated reception ending time of the program; and
    an input unit operable to output a signal in accordance with an input operation from a user;
    wherein the recording control unit starts recording of the content data to the recording medium from the reception ending time of the program if it is determined from the calculated reception ending time that a portion of the content data in midstream of the program is being received when the input unit outputs a signal instructing the start of recording.

2. The information recording and reproducing apparatus as set forth in claim 1, wherein
    the time information includes a performance time and an elapsed time of the program, and
    the time calculation unit calculates the reception ending time on the basis of the performance time and the elapsed time.

3. The information recording and reproducing apparatus as set forth in claim 1, wherein the recording control unit records in the recording medium, in association with the additional information of the program, information which shows that recording is imperfect when the program currently being received was not recorded in its entirety in the recording medium as determined from the calculated reception ending time of the program.

4. The information recording and reproducing apparatus as set forth in claim 1, wherein the recording medium is a hard disk drive, and the position information is information which indicates a sector in the hard disk drive.

5. The information recording and reproducing apparatus as set forth in claim 1, further comprising:
    a program designating unit operable to designate a program recorded in the recording medium in response to an input operation from a user;
    a reading control unit operable to read out from the recording medium the position information associated with the additional information of the designated program, and to read out content data of the designated program from the recording position on the recording medium indicated by the position information; and
    a reproduction processing unit operable to output a reproduction signal based on the content data read out from the recording medium.

6. The information recording and reproducing apparatus as set forth in claim 5, further comprising:
    a display control unit operable to output a display signal for a display screen, wherein
    the reading control unit reads out from the recording medium the additional information of the designated program together with the position information and the content data of the designated program, and
    the display control unit outputs the display signal for displaying the additional information read out by the reading control unit on the display screen.

7. The information recording and reproducing apparatus as set forth in claim 5, wherein
    the program designating unit designates a reproduction order of programs recorded in the recording medium in response to an input operation from a user, and
    the reading control unit sequentially reads out content data from the recording positions on the recording medium indicated by the position information for the programs in the reproduction order designated by the program designating unit.

8. The information recording and reproducing apparatus as set forth in claim 1, wherein the content data includes at least audio data of music.

9. A method for receiving a data stream currently being transmitted, the data stream including content data and additional information including time information with respect to each program in the content data, and for recording the data stream in a recording medium, the method comprising:
    calculating a reception ending time of a program in the content data currently being received based on the received additional information;
    outputting a signal instructing the start of recording in accordance with an input operation from a user; and recording the received content data sequentially in the recording medium, and recording position information in the recording medium in association with the additional information of the program as a head position of another program which will be received next, the position information indicating a recording position of the recorded content data in the recording medium and being recorded at the calculated reception ending time of the program;

wherein the recording step starts recording of the content data to the recording medium from the reception ending time of the program if it is determined from the calculated reception ending time that a portion of the content data in midstream of the program is being received when the signal instructing the start of recording is output.

* * * * *